US012580457B2

(12) United States Patent   (10) Patent No.:    US 12,580,457 B2
Csákány et al.                   (45) Date of Patent:        Mar. 17, 2026

(54) DEVICE AND METHOD FOR CONNECTING A STATOR AND A PULSE INVERTER OF AN ELECTRIC MOTOR OF AN AT LEAST PARTIALLY ELECTRICALLY DRIVEN MOTOR VEHICLE AS WELL AS MOTOR VEHICLE WITH AN ELECTRIC MOTOR

(71) Applicants: AUDI AG, Ingolstadt (DE);
VOLKSWAGEN AKTIENGESELLSCHAFT, Wolfsburg (DE)

(72) Inventors: András Csákány, Gvör (HU); Marvin Emde, Wabern (DE); Andreas Lenz, Wolhagen (DE); Max Possen, Coburg (DE)

(73) Assignees: AUDI AG, Ingolstadt (DE);
VOLKSWAGEN AKTIENGESELLSCHAFT, Wolfsburg (DE)

( * ) Notice: Subject to any disclaimer, the term of this patent is extended or adjusted under 35 U.S.C. 154(b) by 227 days.

(21) Appl. No.: 18/581,942

(22) Filed: Feb. 20, 2024

(65) Prior Publication Data

US 2024/0291355 A1     Aug. 29, 2024

(30) Foreign Application Priority Data

Feb. 23, 2023    (DE) ........................ 10 2023 104398.6

(51) Int. Cl.
| | |
|---|---|
| *H01R 4/42* | (2006.01) |
| *H02K 11/33* | (2016.01) |
| *H02K 15/00* | (2006.01) |

(52) U.S. Cl.
CPC ............... *H02K 11/33* (2016.01); *H01R 4/42* (2013.01); *H02K 15/00* (2013.01)

(58) Field of Classification Search
CPC .......... H01R 4/50; H01R 4/30; H01R 13/193; H01R 4/505; H01R 4/5008; H01R 4/42;
(Continued)

(56)                References Cited

U.S. PATENT DOCUMENTS 1,084,379  A  *   1/1914   N/A .................... B23B 31/1071
                                                           439/864
2,233,216  A  *   2/1941   Irving ...................... H01R 4/50
                                                           439/807
(Continued)

FOREIGN PATENT DOCUMENTS

DE            3718913  A1  * 12/1988   ............... A61N 1/36
DE    10 2005 004 330  A1     8/2006
(Continued)

OTHER PUBLICATIONS

English Translation of IPRP (PCT/IB/338 and PCT/IB/373) (Jan. 18, 2024) and the Written Opinion of ISA (PCT/ISA/237) issued in counterpart International Application No. PCT/EP2022/070449 on Nov. 17, 2022 (11 pages).
(Continued)

*Primary Examiner* — Burton S Mullins
(74) *Attorney, Agent, or Firm* — STAAS & HALSEY LLP

(57)                ABSTRACT

The described examples may relate to a connection device for electrically conductively connecting a stator and a pulse inverter of an electric motor. The connection device includes at least one clamping piece pair with two clamping pieces, which are movable in relation to each other along a clamping direction between a closed and an open position and formed to clamp a stator-side line end with a pulse inverter-side line end between the two clamping pieces in the closed position such that an electrically conductive connection of the line ends is established. The connection device may include a bolt mounted rotatably around a rotational axis extending (Continued)

obliquely with respect to the clamping direction, which includes at least one eccentric portion along its longitudinal extension direction, which is formed to convert a rotational movement of the bolt around the rotational axis into a translational movement of the two clamping pieces of the at least one clamping piece pair to each other until reaching the closed position.

18 Claims, 2 Drawing Sheets

(58) Field of Classification Search
CPC ...... H01R 2201/10; H02K 5/22; H02K 11/30; H02K 11/33; B60R 16/02
USPC .................................................. 439/863–864
See application file for complete search history.

(56) References Cited

U.S. PATENT DOCUMENTS

| | | | |
|---|---|---|---|
| 3,491,329 A | 1/1970 | Lecocq | |
| 6,116,969 A * | 9/2000 | Piriz | H01R 4/5083 |
| | | | 439/783 |
| 8,608,517 B2 * | 12/2013 | La Salvia | H01R 4/5091 |
| | | | 439/864 |
| 10,855,105 B2 | 12/2020 | Boesch | |
| 2005/0055062 A1 * | 3/2005 | Correas | A61N 1/3752 |
| | | | 607/37 |

FOREIGN PATENT DOCUMENTS

| | | |
|---|---|---|
| DE | 10 2017 205 970 A1 | 10/2018 |
| DE | 10 2021 206 540 A1 | 12/2022 |
| EP | 1 561 269 | 5/2004 |
| EP | 4 210 204 A1 | 7/2023 |
| JP | 5-94955 | 12/1993 |
| JP | 2014-132531 | 7/2014 |
| WO | WO 2012/059831 A1 | 5/2012 |

OTHER PUBLICATIONS

Notification concerning transmittal of IPRP (PCT/IB/326) dated Feb. 1, 2024.
German Office Action issued in German Application No. 10 2023 104 398.6 dated Nov. 14, 2023.

* cited by examiner

S1          S2          S3          S4          S5

DEVICE AND METHOD FOR CONNECTING A STATOR AND A PULSE INVERTER OF AN ELECTRIC MOTOR OF AN AT LEAST PARTIALLY ELECTRICALLY DRIVEN MOTOR VEHICLE AS WELL AS MOTOR VEHICLE WITH AN ELECTRIC MOTOR

CROSS-REFERENCE TO RELATED APPLICATIONS

This application claims the foreign priority benefit of German Application No. 2023 104398.6 filed on Feb. 23, 2023, which German Application is incorporated by reference herein in entirety.

BACKGROUND

1. Field

The examples of an invention may relate to a connection device and to a connection method for detachably, electrically conductively connecting a stator to a pulse inverter of an electric motor. In addition, the examples may relate to an electric motor with such a connection device and to a motor vehicle with such an electric motor.

2. Description of the Related Art

As known, the detachable, electrically conductive connection of current-carrying or electrically conductive line ends to each other can be effected by commonly clamping the line ends between two clamping pieces arranged movably to each other. Therein, the two clamping pieces arranged movably to each other can be arranged to a clamping piece pair and be movable towards each other and away from each other along a predetermined clamping direction between a closed and an open position. In the closed position, the line ends can be clamped between the clamping pieces of a respective clamping piece pair such that an electrically conductive connection of the line ends to each other is established.

Such clamping connections are for example known from WO 2012/59831 A1 or else from DE 10 2017 205 970 A1.

In the known clamping connections, the clamping pieces are usually moved towards each other by rotating a clamping screw around a rotational axis. Therein, the rotational axis of the clamping screw extends substantially parallel to the predetermined clamping direction. In other words, the clamping screw has to be accessible in its axial extension to be able to be rotated and thus establish the clamping connection. According to installation space situation and/or mutual arrangement of the components to be connected, however, this accessibility of the rotary screw cannot always be ensured. This can mean that the electrically conductive connection of the individual components of the electric motor for example has to be effected outside of the motor vehicle or before inserting the motor into the motor vehicle. This disadvantageously reduces an efficiency in the manufacture of motor vehicles with such electric motors.

SUMMARY

According to an aspect of the examples, efficiency in mounting motor vehicles with electric motors may be increased, wherein the known advantages of the described clamping connection are to be utilized.

The examples may be the subject matter of the independent claims. Advantageous developments of the examples may be described by the dependent claims, the following description as well as the figures.

In an example, a connection device or a connection piece is provided for detachably, electrically conductively connecting a stator of an electric motor of an at least partially electrically driven motor vehicle to a pulse inverter of the electric motor. Therein, the connection device comprises one or more clamping piece pairs each having two clamping pieces arranged movably to each other. Therein, the clamping pieces are arranged movably towards each other and away from each other along a predetermined clamping direction between a closed and an open position. In an example, the clamping pieces can additionally be fixed or retained in any position between the closed and the open position.

In the closed position, the clamping pieces clamp at least one stator-side line end with at least one pulse inverter-side line end between them such that an electrically conductive connection of the line ends to each other is established. In other words, the clamping pieces are designed to clamp the two line ends between them in the closed position such that they are electrically conductively connected to each other. Therein, there are no particular requirements with respect to an electrical conductivity of the clamping pieces. However, the clamping pieces may be electrically insulated at least with respect to an environment of the respective clamping piece pair.

According to an example, the connection device comprises a bolt or clamping bolt mounted rotatably around a rotational axis extending obliquely with respect to the predetermined clamping direction. In other words, the bolt has an elongated form or shape, wherein a rotational axis of the bolt extends along the longest axis of the elongated shape, which is arranged obliquely with respect to the predetermined clamping direction in the connection device. In an example, the rotational axis may extend centrally through the bolt along the bolt's longitudinal extension direction.

Along the bolt's longitudinal extension direction, thus parallel to the mentioned rotational axis, the bolt comprises an eccentric portion for each clamping piece pair of the connection device. In other words, the bolt comprises one or more eccentric portions along the bolt's longitudinal extension direction, which can adjoin to each other. The eccentric portions can also be formed spaced from each other according to predetermined distances along the longitudinal extension direction of the bolt. Thus, the bolt comprises a rotationally symmetric, for example cylindric, base body, which is formed rotationally symmetrically around the mentioned rotational axis. In the area of the respective eccentric portions, the rotationally symmetric base body comprises indentations or bulges. In other words, a central point of a cross-section of the bolt in the area of a respective eccentric portion is outside of the rotational axis.

According to an example, the bolt with the eccentric portions may be arranged in the connection device such that such an eccentric portion is associated with each clamping piece pair of the connection device. In other words, an eccentric portion is at the level of a respective clamping piece pair.

According to an example, the eccentric portion may be configured to convert a rotational movement of the bolt around the rotational axis in a closing rotational direction into a translational movement of the two clamping pieces of the respective clamping piece pair associated with the bolt towards each other until reaching the closed position. In other words, the bolt with the eccentric portion is spatially arranged to the clamping piece pair associated with the bolt in the connection device such that the eccentric portion first contacts a first one of the clamping pieces of the respective clamping piece pair upon the rotational movement around the rotational axis in the closing direction, wherein the eccentric portion presses against the first one of the clamping pieces with ongoing rotation such that the first one of the clamping devices is moved towards the second one of the clamping pieces of the clamping piece pair along the clamping direction until reaching the closed position.

By the construction of the connection device according to the examples, the advantage may arise that the predetermined clamping direction and the rotational axis of the clamping bolt or of the bolt do not extend parallel to each other, but can be arranged obliquely to each other. According to geometric form of the described eccentric portion, therein, the oblique position of the rotational axis of the bolt with respect to the predetermined clamping direction can be adapted to an existing installation space situation in mounting the described electric motor. Hereby, the efficiency of the described mounting can be significantly fulfilled with respect to the known solutions. At the same time, the advantages of the clamping connection are fully available. Thus, tolerances of the components to be connected caused by manufacture can for example be simply compensated for. In addition, a reproducible clamping force can be adjusted in a contact area of the line ends to be electrically conductively connected to each other. In addition, the described contact can be dismounted and reestablished any number of times. The simplified mounting comes along with a reduction of the mounting time.

Additional advantages may arise from the examples.

In an example, the rotational axis may include an angle between 10 degrees inclusive and 90 degrees inclusive with the predetermined clamping direction. Thus, the clamping direction can extend orthogonally to the rotational direction or rotational axis of the bolt in an extreme form. Hereby, a particularly beneficial spatial arrangement advantageously results during the mounting of the described electric motor. Therein, a geometric form of a circumferential surface of the bolt in the area of a respective eccentric portion can be adapted to a geometric form of the clamping pieces such that an angle between rotational axis of the bolt and predetermined clamping direction can be adequately adjusted.

According to a further example, a first one of the clamping pieces of a respective clamping piece pair comprises a receiving area formed by two opposing, lateral legs for receiving a second one of the clamping pieces of the clamping piece pair. In other words, the first clamping piece can be trilaterally formed with two legs opposing each other, in particular parallel, and one central piece connecting the two legs. Within the receiving area, which is framed by the legs and the central piece, the second clamping piece of the clamping piece pair is arranged, wherein it is movable along the clamping direction between the legs in relation to the first clamping piece. In other words, the second clamping piece can be shifted back and forth along the clamping direction between the legs. Alternatively or additionally, the first clamping piece can be shifted with respect to the second clamping piece along the clamping direction such that each one of the lateral legs and the first clamping piece are moved towards each other or away from each other. In this manner, a clamping effect between the first clamping piece and each one of the lateral legs can be established.

According to an example, the bolt extends within the second clamping piece at least in sections, wherein the eccentric portion of the bolt associated with the respective clamping piece pair presses to the first leg through an aperture in a lateral surface of the second clamping piece facing the first one of the legs upon the rotational movement of the bolt around the rotational axis and hereby moves the second clamping piece towards a second one of the legs for establishing the closed position. In other words, the eccentric portion of the bolt comes into contact with the first one of the legs upon the rotational movement of the bolt in the closing rotational direction. Upon continuing the rotational movement, the eccentric portion presses against the first leg such that the second clamping piece is moved towards the second leg in relation to the first clamping piece. In other words, the eccentric portion repels the second clamping piece at the first leg towards the second leg. The embodiment described here with the bolt extending within the second clamping piece at least in sections is particularly advantageous since a particularly compact construction of the connection device is allowed hereby.

Alternatively or additionally, the bolt can be arranged between the two clamping pieces at least in sections, for example, within the described receiving area between the first and the second clamping piece in sections. In an example, the bolt can be arranged between one of the described legs of the first clamping piece and the second clamping piece at least in sections.

An advantageous development may provide that the first leg comprises a snap element, wherein the eccentric portion comprises a locking element formed complementarily hereto, which is configured to lock into the snap element for forming a locking snap connection upon reaching the closed position. In other words, the eccentric portion can be fixed to the first leg or along a side wall of the first leg facing the receiving area by establishing the locking snap connection upon reaching the closed position. Hereby, over-rotating of the eccentric portion may be advantageously prevented.

Alternatively or additionally, the first leg can comprise a stop along the described sidewall or lateral surface, wherein the eccentric portion abuts on the stop upon reaching the closed position.

Alternatively or additionally, the bolt can be provided with a recess and/or an interlocking along the eccentric portion, in particular on an end wall of the eccentric portion. Thereby, the bolt can be fixed in the closed position and thus the clamping can be permanently ensured. Additionally or alternatively, the described stop can be provided in one or both of the clamping pieces, which ensures that the bolt is not slipped during the mounting.

In an example, the bolt and one or both of the clamping pieces differ with respect to an elasticity of their respective materials. For example, the bolt comprises a material less elastic with respect to the clamping pieces. Hereby, a friction between the eccentric portion of the bolt and the clamping pieces can advantageously be increased.

A further aspect of the examples may relate to a motor vehicle with an electric motor and a connection device according to the examples. Therein, the electric motor comprises a stator and a pulse inverter, wherein the connection device comprises one or more clamping piece pairs each having two clamping pieces arranged movably to each other, which are movable towards each other and away from each other along a predetermined clamping direction between a closed and an open position. The clamping pieces are configured to clamp at least one stator-side line end with at least one pulse inverter-side line end between them in the closed position such that a conductive connection of the line ends to each other is established.

According to the examples, the connection device comprises a bolt mounted rotatably around a rotational axis extending obliquely with respect to the clamping direction, which comprises an eccentric portion along its longitudinal extension direction for each clamping piece pair of the connection device, which is configured to convert a rotational movement of the bolt around the rotational axis in a closing rotational direction into a translational movement of the two clamping pieces of the respective clamping piece pair to each other or towards each other until reaching the closed position.

A further aspect of the examples may be directed to an electric motor with a connection device according to the examples.

A further aspect of the examples may relate to a method for detachably, electrically conductively contacting or connecting a stator and a pulse inverter of such an electric motor of an at least partially electrically driven motor vehicle, wherein the stator and the pulse inverter of the electric motor are first provided. Therein, a respective stator-side line end and a respective pulse inverter-side line end are arranged opposing each other in an adequate installation position of the electric motor in the motor vehicle. Then, the line ends are detachably electrically conductively connected to each other by the connection device according to the examples. For example, this can occur in that the line ends, thus the respective stator-side with the respective pulse inverter-side line end to be connected, are commonly plugged or inserted between the two clamping pieces of a clamping piece pair of the connection device. Thereafter, the clamping pieces of the clamping piece pair are moved towards each other along the predetermined clamping direction by rotating the bolt around the rotational axis extending obliquely with respect to the clamping direction.

Usually, an electric motor with a stator and a pulse inverter comprises multiple line ends to be connected to each other. Therein, multiple of the line ends or line end pairs are usually associated with the same phase.

Therefore, an advantageous development of the method according to the examples may be that multiple or all of the stator-side and pulse inverter-side line ends of the same phase are detachably electrically conductively connected to each other by a common connection device with a corresponding number of clamping piece pairs. In other words, the number of the clamping piece pairs may correspond to the number of the line pairs to be connected. Hereby, the mounting of the described electric motor can advantageously be further accelerated.

Developments of the motor vehicle according to the examples and/or of the electric motor according to the examples and/or of the method according to the examples, which comprise features, as they have already been described in context of the development of the connection device according to the examples, also belong to the invention. For this reason, the corresponding developments of the motor vehicle according to the examples and/or of the electric motor according to the examples and/or of the method according to the examples may not be again described here.

In an example, the motor vehicle may be configured as a car, in particular as a passenger car or truck, or as a passenger bus or motorcycle.

The examples also includes the combinations of the features of the described examples. Thus, the examples also include realizations, which each comprise a combination of the features of multiple of the described examples if the examples have not been described as mutually exclusive.

BRIEF DESCRIPTION OF DRAWINGS

These and other aspects and advantages of examples of the invention will become more apparent and more readily appreciated from the following description of the examples, taken in conjunction with the accompanying drawings of which.

DESCRIPTION

Figure 1:
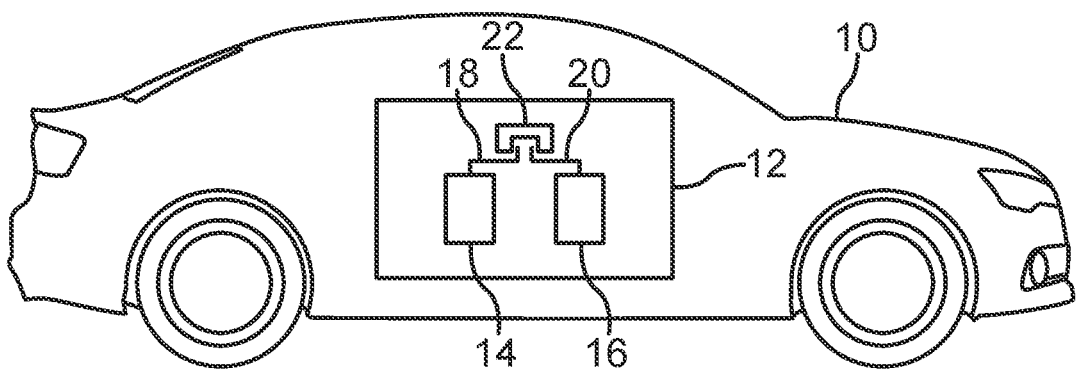
FIG. 1 is a schematic overview representation of an at least partially electrically driven motor vehicle with an electric motor and a connection device.

The execution examples explained in the following are examples of the invention. In the execution examples, the described components of the examples each represent individual features of to be considered independently of each other, which also each develop the examples independently of each other. Therefore, the disclosure also is to include combinations of the features of the examples different from the illustrated ones. Furthermore, the described examples can also be supplemented by further ones of the already described features of the examples.

In the figures, identical reference characters each denote functionally identical elements.

FIG. 1 shows a schematic representation of a motor vehicle 10, wherein the motor vehicle 10 may be an at least partially electrically driven motor vehicle 10. As such, the motor vehicle 10 comprises an electric motor 12 with a stator 14 and a pulse inverter 16. In addition, a stator-side line end 18 and a pulse inverter-side line end 20 are schematically shown in FIG. 1. It should be understood that this representation is purely schematic and that a plurality of such line ends 18, 20 can be present.

According to the representation in FIG. 1, the line ends 18 and 20 are detachably electrically conductively connected to each other by a connection device 22 described in more detail in the following.

Figure 2:
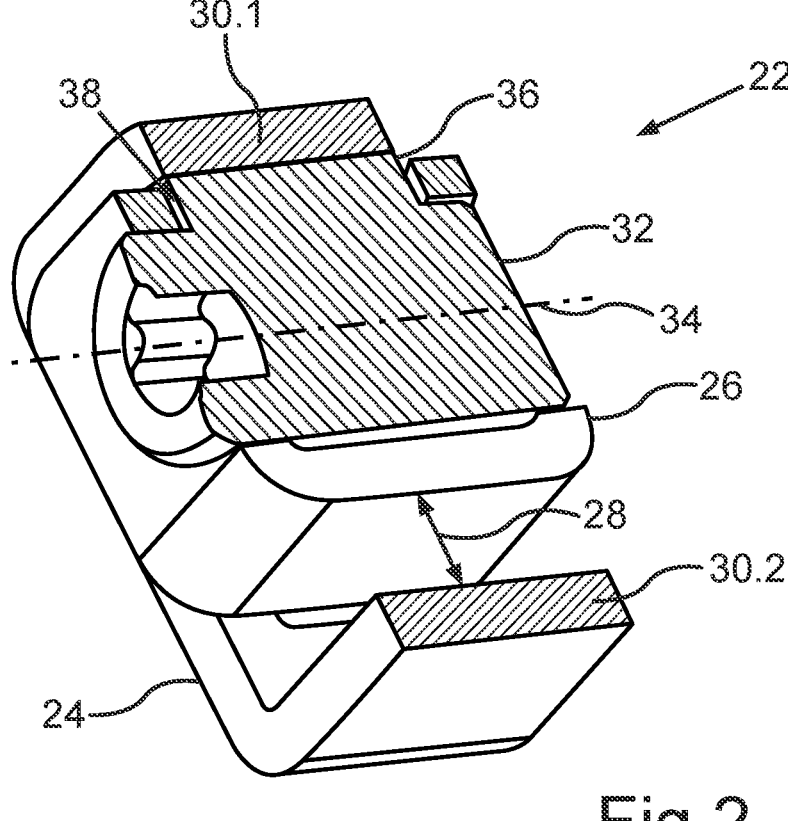
FIG. 2 is a schematic longitudinal sectional representation of a connection device according to an example.

FIG. 2 shows a schematic longitudinal sectional representation of a connection device 22 according to an example. The connection device 22, as it is shown in FIG. 2, includes a clamping piece pair with a first clamping piece 24 and a second clamping piece 26 arranged movably in relation to the first clamping piece 24. The two clamping pieces 24, 26 are movable in relation to each other along a predetermined clamping direction 28. Thus, the clamping piece 26 can be moved back and forth between two legs 30.1 and 30.2 of the first clamping piece 24 along the clamping direction 28. As shown in FIG. 2, the two legs 30.1 and 30.2 are arranged opposing each other and frame a receiving area for the second clamping piece 26.

According to the example shown in FIG. 2, the connection device 22 comprises a bolt 32, which extends within the second clamping piece 26 or is integrated in it at least in sections. Along its longitudinal extension direction, the bolt 32 comprises a rotational axis 34. In the example shown here, the rotational axis 34 includes an angle of 90 degrees with the predetermined clamping direction 28. In other words, the rotational axis 34 is perpendicular with respect to the predetermined clamping direction 28. Upon rotation of the bolt 32 around the rotational axis 34, the eccentric portion 36 of the bolt 32 is moved through an aperture 38 in a side surface of the second clamping piece 26 facing the first leg 30.1 such that the eccentric portion 36 presses against the first leg 30.1. Hereby, the second clamping piece 26 is moved towards the second leg 30.2 along the predetermined clamping direction 28 for establishing the closed position.

Figure 3:
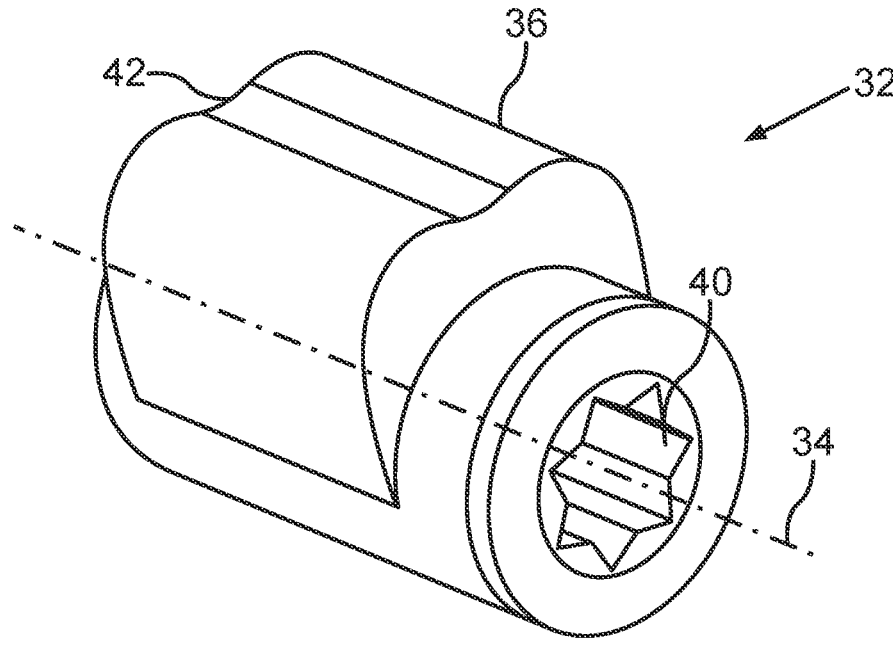
FIG. 3 is a schematic representation of a bolt with an eccentric portion.

FIG. 3 shows a schematic detailed view of the described bolt 32 with the eccentric portion 36. The bolt comprises an engagement opening 40, with which it can be engaged by a correspondingly formed tool head, to rotate the bolt 32 around the rotational axis 34. The engagement opening 40 can for example be formed in the form of a hexagon socket.

In addition, the eccentric portion 36 of the bolt 32 according to FIG. 3 comprises a notch or a locking element 42 along its face side, which can be engaged with a snap element formed complementarily hereto, to prevent a further rotation of the bolt 32 upon reaching the closed position. This snap element not illustrated can for example be formed along an inner side of the first leg 30.1 facing the receiving area, as illustrated in FIG. 2.

Figure 4:
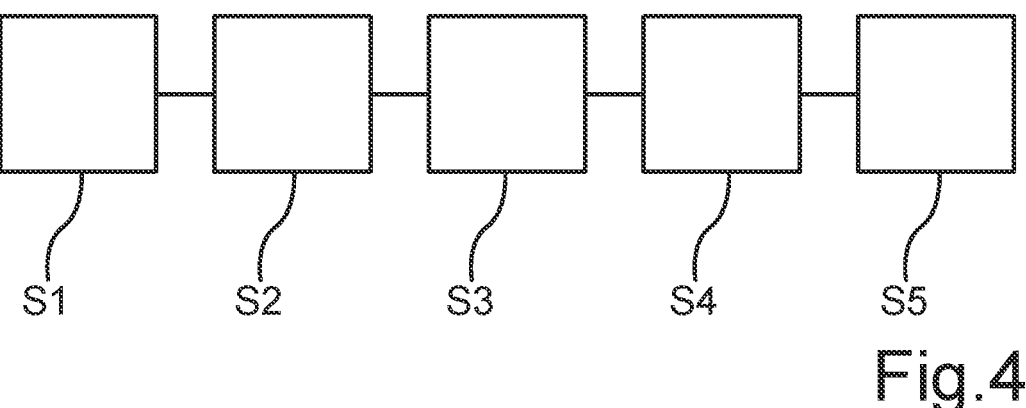
FIG. 4 is a schematic representation of a method for establishing a detachable, electrically conductive connection between a stator and a pulse inverter of an electric motor.

Finally, FIG. 4 shows a schematic representation of a method for detachably electrically conductively contacting a stator 14 and a pulse inverter 16 of an electric motor 12 of an at least partially electrically driven motor vehicle 10. Herein, the stator 14 and the pulse inverter 16 are first provided, wherein a respective stator-side line end 18 and a respective pulse inverter-side line end 20 are arranged opposing each other in a step S1. Then, a connection device 22 is fitted to the line ends 18, 20 to be connected in a step S2 such that they are inserted between two clamping pieces 24, 26 of a clamping piece pair of the connection device 22. In a subsequent step S3, a rotating tool, for example a screwdriver, is inserted into an engagement opening 40 of a bolt 32 of the connection device 22 and the bolt 32 is rotated around its rotational axis 34 in a closing rotational direction with the aid of the rotating tool. The bolt 32 comprises a eccentric portion 36, which converts the rotation of the bolt 32 into a translational movement of the two clamping pieces 24, 26 along a predetermined clamping direction 28 towards each other upon the rotational movement (step S4). Upon reaching a closed position of the clamping piece pair, a locking element 42 of the eccentric portion 36 engages with a complementarily formed snap element of one of the clamping pieces 24, 26 in a final step S5 to fix the bolt in the closed position.

Overall, the examples show how an improved contact of a stator with a pulse inverter of an electric motor can be provided.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

The invention claimed is:

1. A connection device to detachably, electrically conductively connect a stator of an electric motor of an at least partially electrically driven motor vehicle to a pulse inverter of the electric motor, comprising a pair of clamping pieces arranged movably to each other, so that the pair of clamping pieces are movable towards each other and away from each other, along a clamping direction, between a closed position and an open position to clamp at least one stator-side line end with at least one pulse inverter-side line end between the pair of clamping pieces in the closed position to establish an electrically conductive connection of the at least one stator-side line end and the at least one pulse inverter-side line end; and a bolt mounted rotatably around a rotational axis extending obliquely with respect to the clamping direction, the bolt includes an eccentric portion along its longitudinal extension direction for a clamping piece of the pair of clamping pieces, the eccentric portion configured to convert a rotational movement of the bolt around the rotational axis in a closing rotational direction into a translational movement of the pair of clamping pieces towards each other until reaching the closed position.

2. The connection device according to claim 1, wherein the rotational axis includes an angle between 10 degrees inclusive and 90 degrees inclusive with the clamping direction.

3. The connection device according to claim 1, wherein a first clamping piece of the pair of clamping pieces comprises a receiving area formed by two opposing a first lateral leg and a second lateral leg to receive a second clamping piece of the pair of clamping pieces, wherein the second clamping piece is arranged within the receiving area and is movable along the clamping direction between the first lateral leg and the second lateral leg in relation to the first clamping piece, wherein the bolt extends within the second clamping piece at least in sections, so that the eccentric portion of the bolt (32) associated with the second clamping piece presses to the first lateral leg through an aperture in a side surface of the second clamping piece facing the first lateral leg upon the rotational movement and moves the second clamping piece towards the second lateral leg to reach the closed position.

4. The connection device according to claim 3, wherein the bolt is arranged within the receiving area between the first clamping piece and the second clamping piece at least in sections.

5. The connection device according to claim 3, wherein the first lateral leg comprises a snap element, and wherein the eccentric portion comprises a locking element formed complementarily to the snap element, which is configured to lock into the snap element to form a locking snap connection upon reaching the closed position.

6. The connection device according to claim 5, wherein the first lateral leg comprises a stop, and wherein the eccentric portion abuts on the stop upon reaching the closed position.

7. The connection device according to claim 1, wherein at least one portion of the bolt, comprises a material less elastic with respect to the pair of clamping pieces.

8. The connection device according to claim 7, wherein the at least one portion is the eccentric portion.

9. An at least partially electrically driven motor vehicle, comprising:

an electric motor; and a connection device detachably, electrically conductively connecting a stator of the electric motor to a pulse inverter of the electric motor, the connection device including, a pair of clamping pieces arranged movably to each other, so that the pair of clamping pieces are movable towards each other and away from each other, along a clamping direction, between a closed position and an open position to clamp at least one stator-side line end with at least one pulse inverter-side line end between the pair of clamping pieces in the closed position to establish an electrically conductive connection of the at least one stator-side line end and the at least one pulse inverter-side line end; and a bolt mounted rotatably around a rotational axis extending obliquely with respect to the clamping direction, the bolt includes an eccentric portion along its longitudinal extension direction for a clamping piece of the pair of clamping pieces, the eccentric portion configured to convert a rotational movement of the bolt around the rotational axis in a closing rotational direction into a translational movement of the pair of clamping pieces towards each other until reaching the closed position.

10. The at least partially electrically driven motor vehicle according to claim 9, wherein the rotational axis includes an angle between 10 degrees inclusive and 90 degrees inclusive with the clamping direction.

11. The at least partially electrically driven motor vehicle according to claim 9, wherein a first clamping piece of the pair of clamping pieces comprises a receiving area formed by two opposing a first lateral leg and a second lateral leg to receive a second clamping piece of the pair of clamping pieces, wherein the second clamping piece is arranged within the receiving area and is movable along the clamping direction between the first lateral leg and the second lateral leg in relation to the first clamping piece, wherein the bolt extends within the second clamping piece at least in sections, so that the eccentric portion of the bolt associated with the second clamping piece presses to the first lateral leg through an aperture in a side surface of the second clamping piece facing the first lateral leg upon the rotational movement and moves the second clamping piece towards the second lateral leg to reach the closed position.

12. The at least partially electrically driven motor vehicle according to claim 11, wherein the bolt is arranged within the receiving area between the first clamping piece and the second clamping piece at least in sections.

13. The at least partially electrically driven motor vehicle according to claim 11, wherein the first lateral leg comprises a snap element, and wherein the eccentric portion comprises a locking element formed complementarily to the snap element, which is configured to lock into the snap element to form a locking snap connection upon reaching the closed position.

14. The at least partially electrically driven motor vehicle according to claim 13, wherein the first lateral leg comprises a stop, and wherein the eccentric portion abuts on the stop upon reaching the closed position.

15. The at least partially electrically driven motor vehicle according to claim 9, wherein at least one portion of the bolt, comprises a material less elastic with respect to the pair of clamping pieces.

16. The at least partially electrically driven motor vehicle according to claim 15, wherein the at least one portion is the eccentric portion.

17. A method of detachably, electrically conductively contacting the stator and the pulse inverter of the electric motor of the at least partially electrically driven motor vehicle according to claim 9, arranging the at least one stator-side line end and the at least one pulse inverter-side line end to oppose each other, and connecting the at least one stator-side line end and the at least one pulse inverter-side line end with the connection device, so that the at least one stator-side line end and the at least one pulse inverter-side line end are detachably electrically conductively connected to each other by the connection device.

18. The method according to claim 17, wherein multiple or all line ends of the at least one stator-side line end and the at least one pulse inverter-side line end of a same phase are detachably electrically conductively connected to each other by the connection device in common with a corresponding number of a plurality of pairs of the pair of clamping pieces.

* * * * *